(12) United States Patent
Fuller

(10) Patent No.: US 10,018,308 B2
(45) Date of Patent: *Jul. 10, 2018

(54) EXPANSION TANK WITH A PREDICTIVE SENSOR

(71) Applicant: Wessels Company, Greenwood, IN (US)

(72) Inventor: James Fuller, Zionsville, IN (US)

(73) Assignee: Wessels Company, Greenwood, IN (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/808,522

(22) Filed: Jul. 24, 2015

(65) Prior Publication Data

US 2015/0330577 A1    Nov. 19, 2015

Related U.S. Application Data

(63) Continuation of application No. 11/699,172, filed on Jan. 29, 2007, now abandoned, which is a
(Continued)

(51) Int. Cl.
| | |
|---|---|
| *F17C 13/02* | (2006.01) |
| *F24D 3/10* | (2006.01) |
| *B60H 1/20* | (2006.01) |
| *F17C 13/00* | (2006.01) |
| *F24D 19/10* | (2006.01) |

(Continued)

(52) U.S. Cl.
CPC ............. *F17C 13/025* (2013.01); *B60H 1/20* (2013.01); *F17C 13/002* (2013.01); *F24D 3/1008* (2013.01); *F24D 3/1016* (2013.01); *F24D 19/1006* (2013.01); *G01F 23/0007* (2013.01); *G01F 23/02* (2013.01); *G01F 23/22* (2013.01); *B60H 2001/00928* (2013.01); *F17C 2203/0612* (2013.01); *F17C 2250/043* (2013.01); *F24D 2220/0278* (2013.01); *F24D 2220/048* (2013.01)

(58) Field of Classification Search
CPC .................. F17C 13/025; F17C 13/002; F17C 2203/0612; F17C 2250/043; B60H 1/20; B60H 2001/00928; F24D 3/1008; F24D 3/1016; F24D 19/1006; F24D 2220/0278; F24D 2220/048; G01F 23/0007; G01F 23/02; G01F 23/22
USPC ...................................................... 73/290 R
See application file for complete search history.

(56) References Cited

U.S. PATENT DOCUMENTS 3,434,660 A * 3/1969 Horst ........................ F15B 1/26
                                                                                237/66
3,486,530 A * 12/1969 Mercier .................. F15B 1/106
                                                                                138/30
(Continued)

*Primary Examiner* — Lisa Caputo
*Assistant Examiner* — Marrit Eyassu
(74) *Attorney, Agent, or Firm* — Olson & Cepuritis, Ltd.

(57) ABSTRACT

An expansion tank which comprises a tank having a predetermined volume capacity; an expandable elastomeric bladder in the tank, partitioning tank volume into a liquid-containing portion for holding liquid and a gas-containing portion for holding a gas under a pressure that defines a normal pressurized gas volume when the liquid-containing portion holds a predetermined liquid volume; and a proximity sensor mounted to the tank at the gas-containing portion thereof and adapted to emit an alarm signal when volume of the gas-containing portion is reduced.

6 Claims, 5 Drawing Sheets

Related U.S. Application Data continuation-in-part of application No. 11/500,219, filed on Aug. 8, 2006, now Pat. No. 7,775,260.

(51) Int. Cl.
*G01F 23/00* (2006.01)
*G01F 23/02* (2006.01)
*G01F 23/22* (2006.01)
*B60H 1/00* (2006.01)

(56) References Cited

U.S. PATENT DOCUMENTS

| | | | | |
|---|---|---|---|---|
| 4,023,415 A | * | 5/1977 | Garcia | B60C 23/0408 137/493.1 |
| 6,041,820 A | * | 3/2000 | Boehme | F24D 3/08 138/26 |
| 6,401,524 B1 | * | 6/2002 | Incavo | G01M 3/16 73/40 |
| 2004/0149003 A1 | * | 8/2004 | Nestvall | G01F 25/0069 73/1.73 |
| 2005/0270041 A1 | * | 12/2005 | Lieder | G01B 7/14 324/663 |
| 2006/0021448 A1 | * | 2/2006 | Young | G01F 17/00 73/861.18 |
| 2006/0131314 A1 | * | 6/2006 | Lombari | B29C 65/562 220/721 |

* cited by examiner

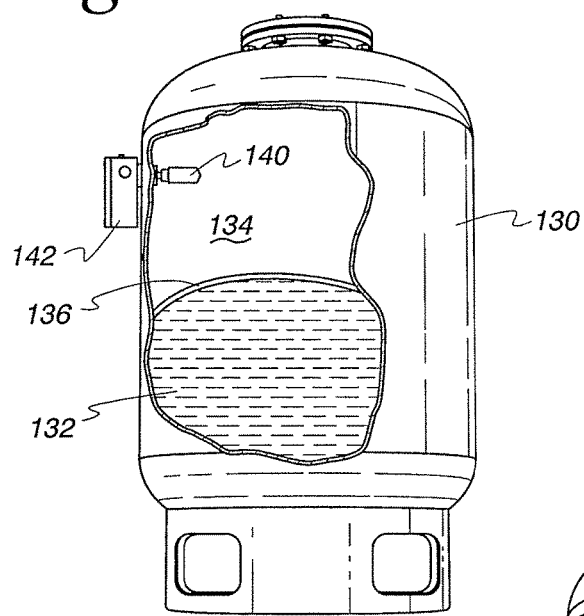
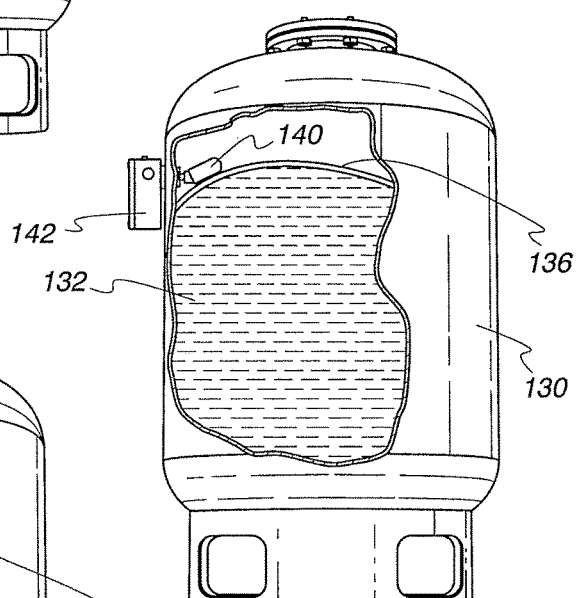
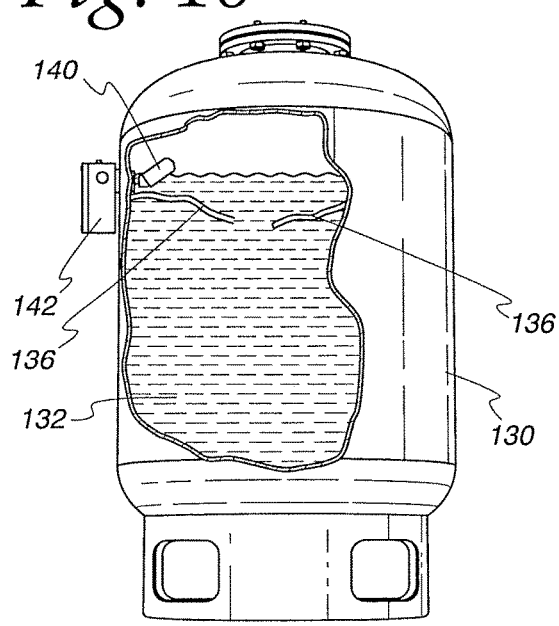

EXPANSION TANK WITH A PREDICTIVE SENSOR

CROSS-REFERENCE TO RELATED APPLICATION

This application is a continuation of U.S. Ser. No. 11/699,172 filed on Jan. 29, 2007 which in turn, is a continuation-in-part of U.S. Ser. No. 11/500,219 filed on Aug. 8, 2006, now U.S. Pat. No. 7,775,260.

FIELD OF INVENTION

This invention relates to expansion tanks in hydronic systems and the like. More particularly, this invention relates to predictive sensors in expansion tanks that are part of hydronic systems and the like.

BACKGROUND OF INVENTION

Hydronics refers to the use of water as a heat transfer medium in heating and cooling systems. Hydronic systems are commonly utilized in heating, ventilating and air conditioner (HVAC) applications. Typical hydronic systems include a circulating heat transfer medium loop, associated valves, a radiator, a pump, and a boiler or chiller to implement the desired heat transfer. A water loop hydronic system also must include at least one expansion tank to accommodate a varying volume of the heat transfer liquid, such as water, inasmuch as the liquid volume contracts and expands as it cools and heats. The expansion tanks utilize an elastomeric diaphragm pressurized with compressed gas such as air to accommodate the variations in liquid volume by further gas expansion or compression, and help control pressure in the hydronic system.

Expansion tanks usually include a diaphragm to hold the excess liquid and a compressed gas portion for controlling over-all system pressure. When the diaphragm is overexpanded due to an excessive system pressure or a gas leak from the tank, the diaphragm can burst necessitating a costly system shut-down for repair. It would be advantageous to detect not only system failures such as a rupture of the diaphragm but also a condition wherein the diaphragm has been overly expanded and is likely to burst unless remedial steps, e.g., reduction in system pressure by draining, are timely taken.

Accordingly, it is an object of the present invention to provide an expansion tank having excessive diaphragm movement alarm means mounted thereto for monitoring expansion of the diaphragm within the expansion tank.

The term "diaphragm" as used herein and in the appended claims denotes an elastomeric deformable web or membrane that spans the tank and is secured to the sidewall of the tank (FIG. 8) or an elastomeric bladder suspended in the tank (FIG. 2) and adapted to hold a liquid. In either case, the web or membrane, as well as the bladder, partitions the tank interior into two compartments or portions—a closed, gas-containing portion for the containment of a gas under pressure and a liquid-containing portion for the holding of a portion of the liquid that expands from the system.

It is a further object of this invention to provide an expansion tank system and method of use which includes an expansion detector that does not damage the diaphragm in the expansion tank.

It is also an object to provide an expansion tank having a sensor element which is able to detect potential diaphragm failure modes, i.e. tank flooding and/or over-extension of a tank diaphragm.

It is yet another object to provide an expansion tank alarm system in module form so that it may be readily installed or replaced through a tank coupling.

These and other objects and advantages of the apparatus and method aspects of the present invention will be apparent to those skilled in the expansion tank art.

SUMMARY OF THE INVENTION

Expansion tanks embodying the present invention are capable of detecting a potential failure condition in an expansion tank due to an abnormal deflection of the tank's diaphragm in a hydronic system, loss of counterbalancing gas pressure in the tank, and the like.

In particular, an expansion tank of the present invention comprises a tank having a predetermined volume capacity and an expandable diaphragm in the tank. The expandable diaphragm partitions the tank volume into a liquid-containing portion for holding a liquid and a gas-containing portion for holding a gas under a pressure that defines a normal pressurized gas volume when the liquid-containing portion of the tank holds a predetermined liquid volume. A proximity sensor is mounted to the tank at the gas containing portion thereof and is adapted to emit an alarm signal when the gas containing portion is reduced as a result of diaphragm expansion.

A wide variety of proximity sensors, capable of detecting expansion of the diaphragm mounted in the tank can be utilized. Illustrative are the capacitive proximity sensors such as a dielectric type capacitive proximity sensor, a conductive type capacitive proximity sensor, and the like, mechanical proximity sensors such as stain gages and the like, electro-mechanical proximity sensors, and the like.

As stated hereinabove, the diaphragm can be an elastomeric, deformable web or membrane that partitions the tank interior, or an elastomeric bladder mounted in the tank that defines the liquid-containing portion of the tank.

A method aspect of the present invention is directed to monitoring the size of an expandable diaphragm situated in an expansion tank and comprises the steps of detecting by means of a proximity sensor the presence of an expansion tank diaphragm in the vicinity of a predetermined tank wall portion and generating an alarm in response to a signal received from the proximity sensor.

The proximity sensor can be mounted to the tank in several ways, depending upon the type of proximity sensor utilized. In the case of the capacitive proximity sensors, these sensors can extend into the gas-containing portion of the tank through an appropriate coupling, or these sensors can detect the presence of the expanded diaphragm through a sight glass and the like provided in the tank wall. In the case of a mechanical or electro-mechanical proximity sensor, at least a portion of the sensor extends into the gas-containing portion of the tank. The mechanical or electro-mechanical proximity sensors are activated by physical contact with the diaphragm.

The proximity sensors contemplated by the present invention are also capable of detecting a flooding condition within the tank, that is, the condition when the diaphragm has burst and liquid in the expansion tank has encroached into the gas-containing portion of the tank.

Expansion tanks equipped with a diaphragm proximity sensor according to the present invention are also suitable for use in municipal water and sewage handling systems, power wash systems, reverse osmosis systems, fuel handling systems, fire protection systems, and the like where fluctuations in system pressure of a liquid must be accommodated.

BRIEF DESCRIPTION OF THE DRAWINGS

In the drawings.

FIG. 8 is a schematic illustration of an expansion tank embodying the present invention and under normal operating conditions;

FIG. 9 is a schematic illustration of an expansion tank embodying the present invention and under abnormal, excessive system pressure condition; and FIG. 10 is a schematic illustration of an expansion tank embodying the present invention and showing a ruptured diaphragm as well as a flooded condition.

DESCRIPTION OF PREFERRED EMBODIMENTS

Figure 1:
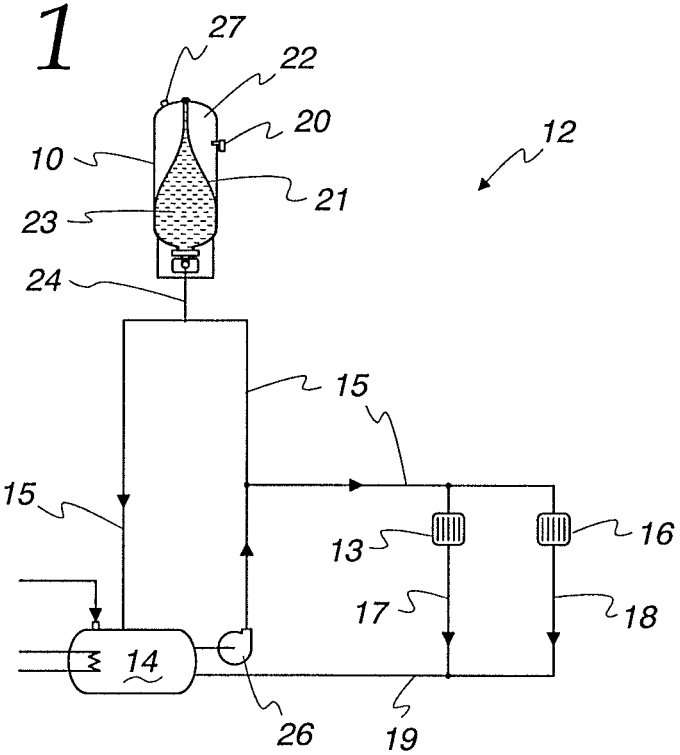
FIG. 1 is a schematic illustration of a closed-loop hydronics system that utilizes an expansion tank embodying the present invention.

The invention described herein is, of course, susceptible of embodiment in many forms. Shown in the drawings and described hereinbelow in detail are preferred embodiments of the present invention. It is to be understood, however, that the present disclosure is an exemplification of the principles of this invention but does not limit this invention to the illustrated embodiments.

Figure 2:
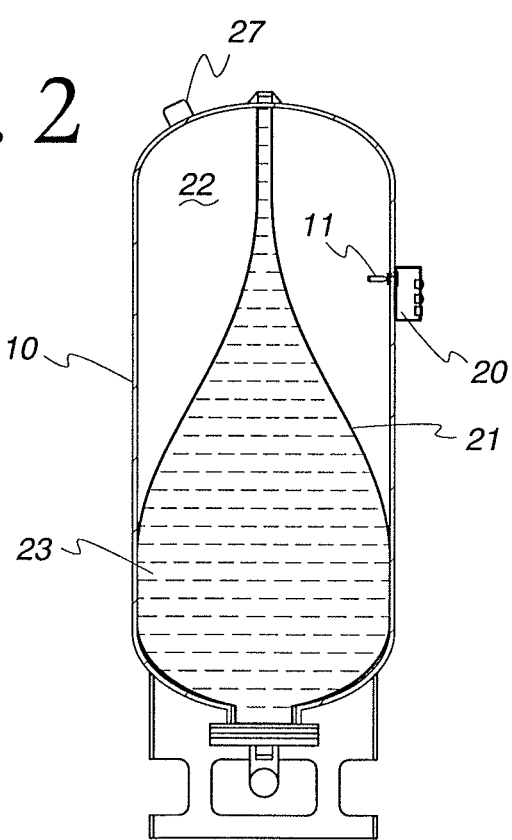
FIG. 2 is an enlarged elevational view of the expansion tank shown in FIG. 1.

Referring to FIGS. 1 and 2, a closed loop heating system 12 includes expansion tank 10 equipped with proximity sensor 11 and alarm module 20 mounted to tank 10. Proximity sensor 11 preferably is a dielectric type capacitive proximity sensor such as Model C1ALLAN1-P, commercially available from Stedham Electronics Corporation, Reno, Nev. 89502, U.S.A. Boiler 14 supplies hot water which is circulated through radiators 13 and 16 by pump 26 via lines 15, 17, 18 and 19. Line 24 is in fluid flow communication with line 15 as well as with bladder-type diaphragm 21 in expansion tank 20. Excess system water 23 is held within bladder-type diaphragm 21. System pressure, typically about 12 to about 30 pounds per square inch gage (psig) is maintained by reason of pressurized gas within gas-containing portion 22. Tank 10 is also equipped with air charging valve 27 for adjusting air pressure in the gas-containing portion 22.

Figure 3:
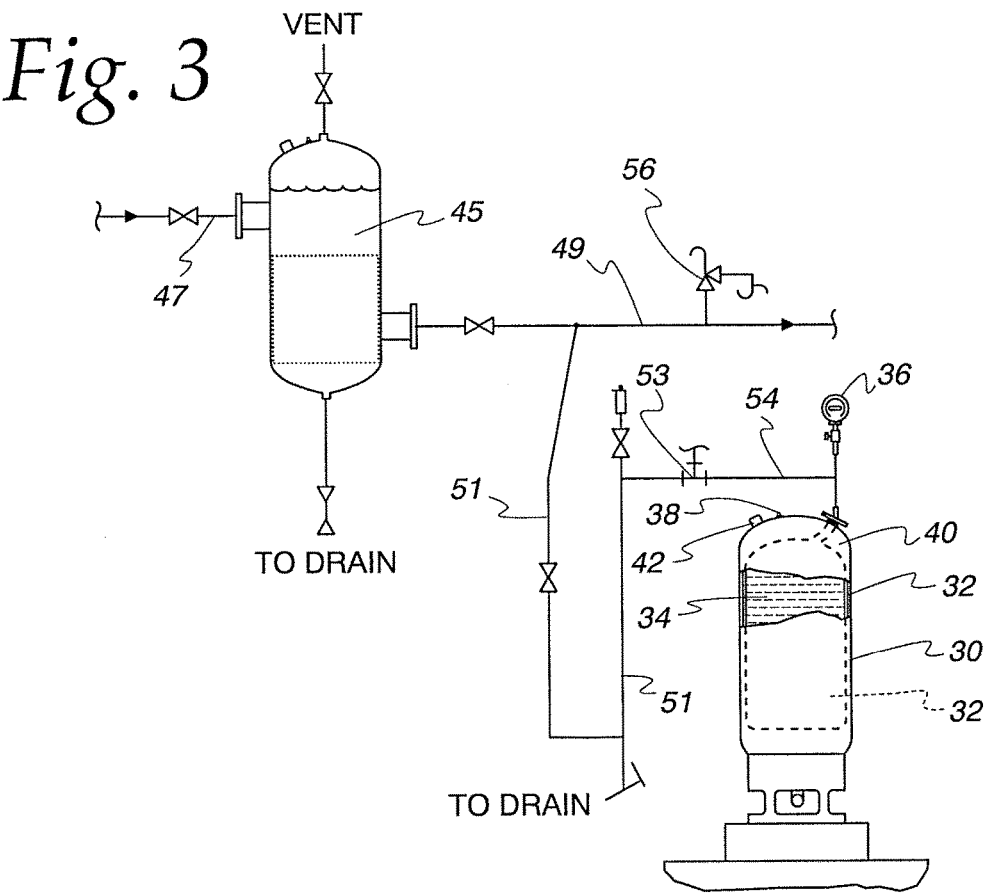
FIG. 3 is a schematic illustration of an air separation and expansion tank detail of a hydronics system, the expansion tank being provided with a bladder type diaphragm.

FIG. 3 illustrates a hydronics installation. Floor mounted, vertical expansion tank 30 is equipped with suspended bladder 32 that holds excess system water 34. Pressure gage 36 monitors system water pressure. Air charging valve 38 is provided on tank 30 for pressurization of gas-containing portion 40 of tank 30. Proximity sensor 42 is mounted to tank 30 and monitors conditions within the gas-containing portion 40. If bladder 32 expands beyond a predetermined limit due to an abnormal increase in system pressure or an air leak in gas-containing portion 40, proximity sensor 42 detects such an expansion and emits a signal that energizes an appropriate alarm so that system water pressure can be relieved before excessive stress or bursting pressure is reached within bladder 32. If overexpansion of bladder 32 is due to an air leak from gas-containing portion 40, additional air pressure can be supplied through air charging valve 38.

Air separator 45 is provided in feed line 47 that communicates via water line 49 with the input or suction side of a pump (not shown). Expansion tank 30 and its bladder 32 are, in turn, in fluid flow communication with water line 49 via line 51. Tee connection 53 is provided in line 54 to facilitate connection with another, parallel expansion tank if desired. System pressure relief valve 56 is also provided in communication with water line 49.

Figure 4:
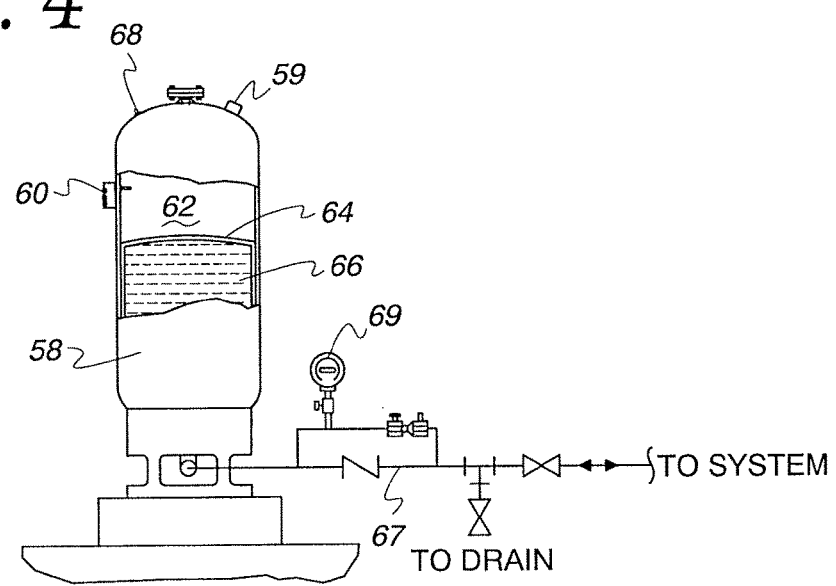
FIG. 4 is a schematic illustration of a hydropneumatic expansion tank embodying the present invention and utilizing a diaphragm in the form of an elastomeric web that partitions the tank volume into a gas-containing portion and a liquid containing portion.

FIG. 4 illustrates a typical installation of a vertical, floor mounted expansion tank 58 that is provided with proximity sensor 60 mounted to tank 58 in the region that defines gas-containing portion 62 within tank 58. Membrane 64 partitions tank 58 into a gas-containing portion 62 and liquid containing portion 66. Tank 58 also has an air charging valve 68 and inspection port 59.

Liquid-containing portion 66 is in fluid flow communication with a water system via line 67. Pressure gage 69 in line 67 monitors system water pressure.

Figure 5:
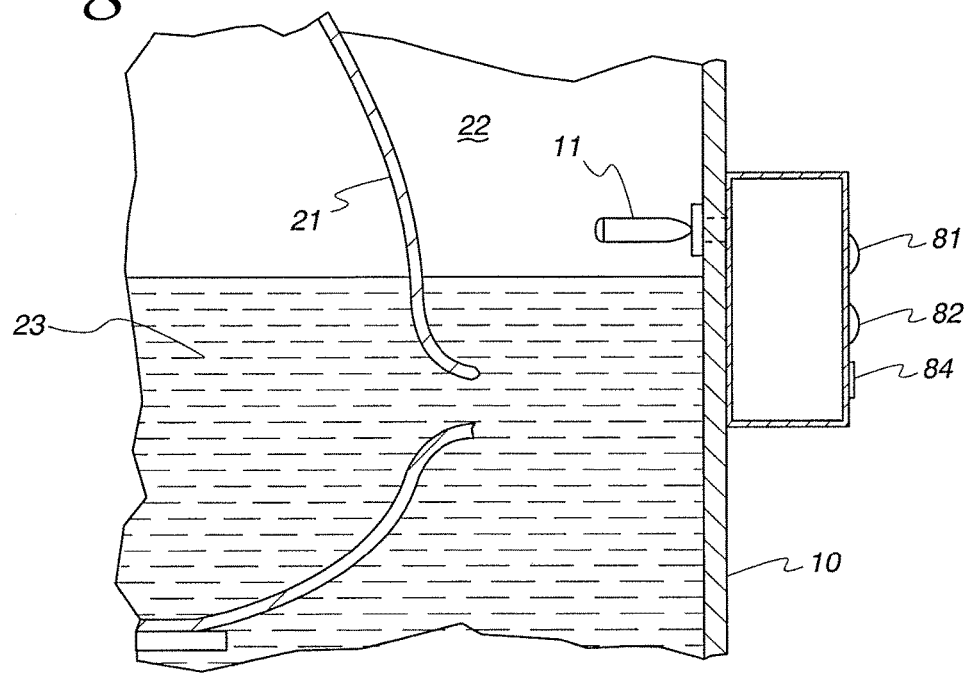
FIG. 5 is a schematic illustration of an electro-mechanical proximity sensor mounted in the wall of an expansion tank at flooding conditions.

FIG. 5 illustrates a flooding condition in expansion tank 10. Bladder-type diaphragm 21 has burst and water held within the liquid-containing portion 23 has entered gas-containing portion 22. Proximity sensor 11 mounted to tank detects the approaching water level, emits an alarm signal that, in turn, energizes alarm module 20 equipped with audible alarm 81 as well as with visual indicator light 82 and on/off/reset button 84. Remote alarm capabilities can be incorporated as well, if desired.

Figure 6:
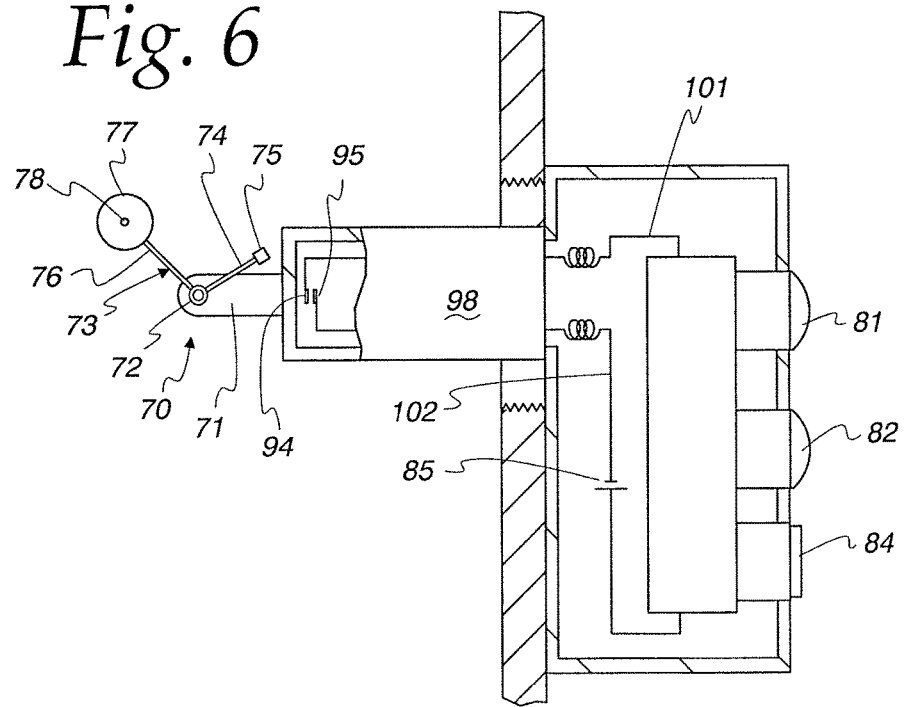
FIG. 6 is a schematic illustration of an electro-mechanical proximity sensor mounted in the wall of an expansion tank.

FIG. 6 illustrates electro-mechanical proximity sensor 70 equipped with alarm module 90 mounted in the wall of an expansion tank. Proximity sensor 70 extends into the gas-containing portion of the tank and alarm module 90 associated with sensor 70 is situated outside the expansion tank.

Proximity sensor 70 includes a float 77 mounted at the distal end of arm 76 which forms an integral, substantially L-shaped piece 73 with arm 74 that carries a magnet 75 at the distal end thereof. The L-shaped piece 73 is pivotably mounted at 72 to bar 71 supported by housing 98. When float 77 is moved upwardly either by an expanding bladder or the buoyant force exerted on float 77 by a rising water level, magnet 75 approaches and closes contact points 94 and 96 in housing 98, thereby closing the alarm circuit in alarm module 90. This alarm circuit includes, in addition to contact points 94 and 96, leads 101 and 102, a power source such as battery 85, audible alarm 81, visual alarm 82, and on/off/reset button 84.

Figure 7:
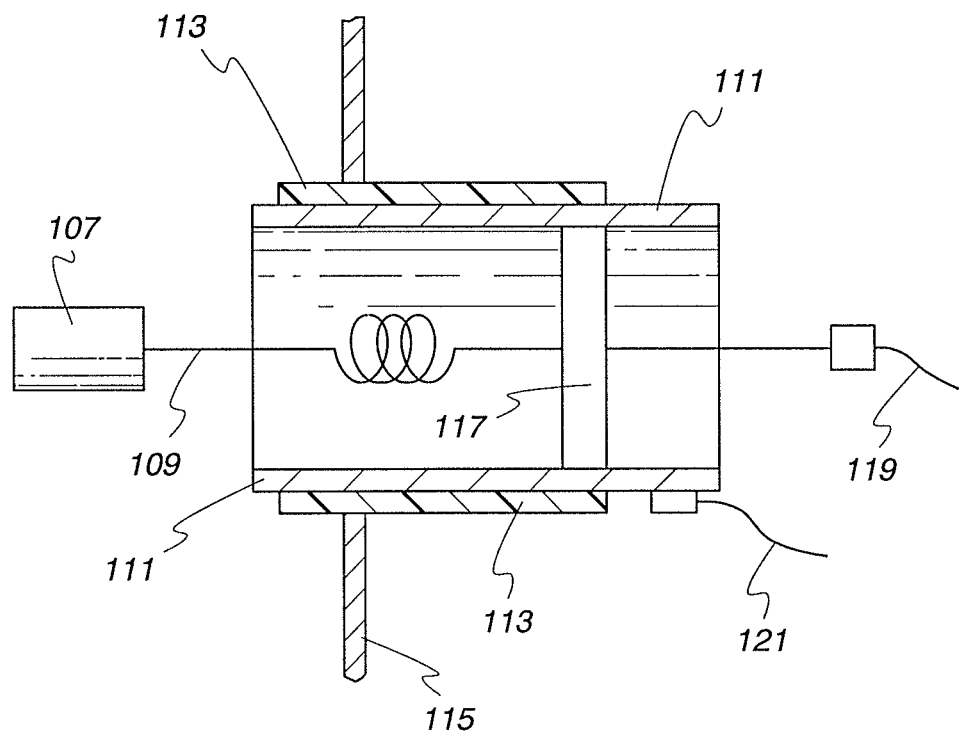
FIG. 7 is a schematic illustration of another type of electro-mechanical proximity sensor.

FIG. 7 depicts another proximity sensor suitable for use in practicing the present invention.

In this particular embodiment float 107 is affixed to the distal end of a wire spring 109 mounted in a conductive sleeve 111 but electrically isolated therefrom. Leads 119 and 121 are connected, respectively, to wire spring 109 and conductive sleeve 111 and to the same alarm module as that shown in FIG. 6. Wire spring 109 is held in place inside conductive sleeve 111 by epoxy disc 117. The alarm circuit is closed and an alarm signal emitted when float 120 is urged upwardly either by an expanding diaphragm or a rising water level and wire spring 109 which contacts conductive sleeve 111.

FIGS. 8, 9 and 10 illustrate the position of the diaphragm in an expansion tank under various conditions. In FIG. 8 expansion tank 130 is shown under normal operating conditions, the liquid 132 held in tank 130 occupying about 40 percent of tank volume, pressurized gas 134 occupying about 60 percent of tank volume and being separated from liquid 132 by diaphragm 136. In this particular example the system water pressure is in the range of about 12 to about 30 psig and is counterbalanced by pressurized gas 134. Proximity sensor 140 is mounted in the wall of tank 130. Alarm module 142 associated with sensor 140 is on the outside of the tank 130.

When the system water pressure rises (FIG. 9), more of liquid 132 occupies the tank volume and diaphragm 136 becomes distended, shifting proximity sensor 140 upwardly and energizing the alarm. Similarly, when diaphragm 136 has burst, rising water level in tank 130 maintains proximity sensor 140 in an upwardly position as shown in FIG. 10.

Under normal operating conditions in a hydronics system, the liquid volume in the expansion tank is about 40 percent of total tank volume and the pressurized gas or air volume is about 60 percent of total tank volume. An alarm condition occurs when the diaphragm is distended to near its maximum tensile or burst strength. The latter, of course, is dependent on the material of construction and thickness of the diaphragm. Expansion tank diaphragm are butyl rubber, natural rubber, nitrile rubber, and the like.

Preferably, the proximity sensor is positioned at or in the expansion tank so that an alarm signal is emitted when the gas-containing portion of the tank has been reduced by at least about 40 percent of normal value.

The emitted alarm signal can be processed in a variety of ways. As described hereinabove, the alarm signal can be utilized to energize an audible alarm or a visual alarm. The alarm signal can also be transmitted to a remote site having a centrally located monitor or data logger that can receive alarm signals from more than one expansion tank in a hydronics system or systems. The choice of a particular expansion tank monitoring arrangement depends largely on the size of the involved hydronic system or systems involved.

I claim:

1. An expansion tank for a hydronic system which comprises
    a tank having a predetermined volume capacity;
    an expandable elastomeric bladder suspended in the tank, partitioning tank volume into a liquid-containing portion defined by the bladder for holding liquid and a gas-containing portion defined by the tank together with the bladder for holding a gas under a pressure; and
    a proximity sensor mounted to the tank in the gas-containing portion thereof and configured to emit an alarm signal when the expanded bladder occupies more than 40 percent of total tank volume.

2. The expansion tank in accordance with claim 1 wherein the proximity sensor is a dielectric capacitive proximity sensor.

3. The expansion tank in accordance with claim 1 wherein the proximity sensor is a conductive capacitive proximity sensor.

4. The expansion tank in accordance with claim 1 wherein the proximity sensor is a mechanical sensor situated in the gas-containing portion of the tank.

5. The expansion tank in accordance with claim 1 wherein the proximity sensor is an electro-mechanical sensor situated in the gas-containing portion of the tank.

6. A hydronics system which includes an expansion tank having an expandable elastomeric bladder suspended therewithin and partitioning tank volume into a liquid-containing portion for holding liquid and a gas-containing portion for holding a gas, and a proximity sensor for said elastomeric bladder mounted in the tank and configured to emit an alarm signal when volume of the gas-containing portion is reduced by a predetermined amount as a result of expansion of the elastomeric bladder.

* * * * *